Patented June 12, 1923.

1,458,715

UNITED STATES PATENT OFFICE.

ELLIS A. LLOYD, OF NEW YORK, AND VICTOR P. GERSHON, OF BROOKLYN, NEW YORK, ASSIGNORS TO WILLIAM M. GROSVENOR, OF NEW YORK, N. Y.

PROCESS FOR MAKING NITROBENZOIC ACID AND INTERMEDIATES.

No Drawing.   Application filed March 23, 1920. Serial No. 368,162.

*To all whom it may concern:*

Be it known that we, ELLIS A. LLOYD and VICTOR P. GERSHON, citizens of the United States, and residents of New York, county of New York, State of New York, and Brooklyn, county of Kings, State of New York, respectively, have invented certain new and useful Improvements in Processes for Making Nitrobenzoic Acids and Intermediates, of which the following is a specification.

Our invention relates to improvements in processes for producing nitro-benzoic acids, particularly ortho-nitro-benzoic acid as an intermediate in the manufacture of anthranilic acid and the like. Various processes have been suggested for making such products but they have all had serious disadvantages in that the yield was so small as to make them impractical or the resulting product was seriously contaminated with impurities, or both or the process was otherwise impractical. We not only aim to overcome these disadvantages but a further advantage of our process is that we utilize as a raw material, ortho-nitro-toluol, which has generally been treated as a waste product, being a necessary by-product in the manufacture of para-nitro-toluol and paratoluidine. Another feature is that we may use relatively cheap treatment chemicals or convert or recover the chemicals used in forms as valuable or more valuable than those in which they are originally employed. According to our invention in its preferred form we are able to produce ortho-nitro-benzoic acid and also anthranilic acid of great purity and whiteness, from which dyes of strong color and solid methyl anthranilate can easily be produced. Further and more specific objects, features and advantages will more clearly appear from the description given below.

Acording to our invention in its preferred form we treat ortho-nitro-toluol with an oxydizing agent to produce ortho-nitro benzoic acid. We have discovered that pure ortho-nitro-toluol is not readily acted upon by nitric acid even of the highest specific gravity execept to oxidize the side chain in the desired way provided nitric of about 1.4 Sp. G. is used to start with, or only a small quantity of nitric is used to begin with. We have also found that in the strong nitric acid the ortho-nitro-toluol is far more soluble and capable of far more rapid and complete conversion. Furthermore, we have found that by first treating the ortho-nitro-toluol with a relatively small quantity of nitric acid of specific gravity of preferably about 1.4 (which is about 65% strength) all the remaining nitric acid may be added in the form of 90%–96% strength, thereby maintaining the average or mean effective strength of the nitric acid for rapid operation, during substantially the entire treatment. In this way we are able to keep the ortho-nitro-toluol in solution and maintain energetic progress of the reaction and obtain relatively high yields of ortho-nitro-benzoic acid of excellent quality.

As a preferred example of one way in which our invention may be carried out we take 700 pounds of ortho-nitro-toluol $C_6H_4NO_2.CH_3$ of a good commercial grade, distilling preferably within a range of 1° C. and we place this in a 250 gallon porcelain or enamel lined still with a glass or enameled reflux condenser connected thereto, and put in about 100 pounds of nitric acid of 1.4 specific gravity to start the reaction, the still being heated to produce a steady active boil. The heating and boiling is continued for about 4 days during which time a steady slow addition of 90%–95% nitric acid is maintained at such a rate that about 1400 pounds of nitric acid is added in this time. The rates of addition and of reflux distillation are preferably so counter-balanced that, the effective strength of the nitric acid in the still is maintained.

By thus governing the rate of reaction we are enabled to recover practically all the nitric acid consumed either as 38° nitric acid from suitably arranged absorption and re-oxidation towers such as are used in the manufacture of nitric acid and are well known in that art, or we may obsorb the gases in caustic soda and recover about 75% of the nitric acid consumed in the form of much more valuable nitrite of soda, pure enough for use in diazotizing organic bodies, such as the anthranilic acid, in making dyestuffs therefrom.

After the addition of the 1400 pounds of strong nitric acid as above we continue the heating at a lively rate for about 24 hours longer, during which time the strength of the remaining acid is decreased to about 1.2 specific gravity (which is about 32% strength) or even less, by reason of its consumption in reacting with the remaining unconverted ortho nitro-toluol. By this means the solubility of both the ortho-nitro-toluol and the ortho-nitro-benzoic acid produced in the liquor is very greatly reduced and recovery of these materials greatly simplified. If desired a portion of the distillate may be drawn off through a condenser above the reflux during the latter part of the run and this distillate may be redistilled slowly to reconcentrate the nitric acid therein so that it may be used over again. By suitable adjustment of distilling conditions most of the necessary 100 pounds of nitric acid of 1.4 sp. gr. for starting the next run may thus be recovered.

After completion of this oxidation with nitric acid the batch is preferably taken from the still and cooled for 24 hours. The lower the final temperature, the better. A large crop of ortho-nitro-benzoic acid crystals $C_6H_4.NO_2COOH$ results; at the same time there is also separated out practically all of unconverted ortho-nitro-toluol, no longer materially soluble in the weak cold nitric acid. The crystals may then be well deliquored and washed with cold water either by centrifugal or suction filter, the liquor and wash waters being added to the weak distilled nitric acid to be concentrated or otherwise suitably recovered for use. The crystals may then be air dried whereby lingering traces of nitric acid are completely removed or may be immediately washed with benzol or other suitable organic solvent. In either case the organic solvent quickly and completely dissolves out the unconverted ortho-nitro-toluol without dissolving any material amount of the ortho-nitro-benzoic acid. The ortho-nitro-toluol so dissolved out, with any traces of ortho-nitro-benzoic acid, is easily recovered by distillation of the benzol and it may then be added to the ortho-nitro-toluol of another batch to be treated.

The large yield of ortho-nitro-benzoic acid crystals obtained is of extreme whiteness and purity, generally melting within 1° C. of the theoretical.

This ortho-nitro-benzoic acid may be reduced in various ways, but we preferably carry it out as follows.

We have discovered that great contamination may result unless this benzoic acid is first and separately neutralized. We therefore prefer to prepare a solution of about 40 pounds of caustic soda and add about 500 pounds of water in which the caustic is dissolved. Soda ash may be used instead of caustic soda. This solution of caustic we use to wash 167 pounds of the ortho-nitro-benzoic acid into the reflux still in which solution is completed, with the result that the benzoic acid is converted into ortho-nitro-benzoate of soda, $C_6H_4.NO_2.COONa$.

To reduce this benzoate compound we preferably use one of the sodium sulphides. We have found that ordinary commercial sodium sulphide contains impurities, particularly iron, which seriously affects both the yield and quality of product of the reaction. We therefore substantially remove these either by careful recrystallization or, better, by dissolving about 240 pounds of commercial sodium sulphide crystals in 2200 pounds of water making approximately a 4% solution and boiling the mixture for about 1 hour. After this the liquid is rapidly filtered off hot, and the filtrate alone is used. Clarifying agents such as fuller's earth, etc., may also be used with good effect in this step to purify the sodium sulphide. The filtrate obtained we then preferably evaporate until a concentration of about 5½% is obtained and again filtered hot. In a reflux still 32 pounds of flowers of sulphur is added to this filtrate and boiled until the sulphur has all passed into solution. All of the above treatments of the sodium sulphide are best carried out in covered vessels, provided, when necessary, with condensers, in order to avoid too much oxidation by reason of contact with the air.

To the resulting purified sodium sulphide solution in the still in which the sulphur is dissolved (which may be sodium bisulphide in solution) is added the ortho-nitro-benzoate of soda mixture and the whole is boiled under a reflux condenser for about 24 hours or until examination shows the reduction to ortho-amido-benzoate of soda $C_6H_4.NH_2.COONa$ to be complete. When we refer to sodium sulphide we mean any of the sodium sulphides. Then 36½ pounds of HCl is added in the form of a solution or sufficient to just neutralize the caustic soda with which the ortho-nitro-benzoate of soda was originally formed. The batch (slightly diluted if need be to prevent crystallization of salt or thiosulphate) is then cooled as thoroughly and quickly as possible and the anthranilic acid, $C_6H_4.NH_2.COOH$, thereby separated out is centrifuged and washed with a little cold water, and then dried.

We have found that by cooling before and during neutralization the tendency of the anthranilic acid to decompose the thiosulphate and form sulphur is so far prevented that an excellent grade of anthranilic acid is directly obtainable. If, however, greater purity is desired the dry anthranilic acid may be washed with benzol to dissolve out any traces of sulphur or it may finally be reprecipitated from hydrochloric acid if a practically chemically pure anthranilic acid is desired.

The first liquors from which the anthranilic acid was separated by acidification, are best allowed to stand for some days so that the last small amounts of anthranilic acid may slowly crystallize out and be filtered. The liquors may then be evaporated to substantial dryness, the traces of organic impurities removed by extraction with organic solvents and practically all the sodium sulphide used may be recovered in the form of sodium thiosulphate contaminated with a little salt which for many purposes is of no consequence.

While we have described in detail one preferred embodiment of our invention it will be understood that many changes and modifications may be made and the invention embodied in widely differing forms without departing from the spirit and scope of the invention in its broader aspects. For example para-amido-benzoic can be made from para-nitro-toluol. Recoveries of by-products may be partially or wholly dispensed with. Other suitable solvents for purifying the ortho-nitro-benzoic or the saline residues, may be used. The sulphur in the solution may be decreased or dispensed with and other products than thiosulphate produced. Also other reducing compounds, than the sodium sulphide, potassium or ammonium may be used, such as hydrosulphides, bisulphites or even combinations of materials, such as a metal and a suitable acid, or iron and caustic soda.

What we claim and desire to secure by Letters Patent, is:

1. The process of making nitro-benzoic acid which consists in treating a mono-nitro-toluol with nitric acid of 60% strength or greater to oxydize the nitro-toluol and produce the mono-nitro-benzoic acid.

2. The process of making mono-nitro-benzoic acid in which mono-nitro-toluol is treated with nitric acid and adding further nitric acid after the reaction has progressed, to build up the strength of the acid which oxydizes the mono-nitro-toluol to mono-nitro-benzoic acid.

3. The process of making nitro-benzoic acid which consists in treating a mono-nitro-toluol with nitric acid of 60% strength or greater to oxydize the nitro-toluol and produce the mono-nitro-benzoic acid, the nitric acid being gradually added to the ortho-nitro-toluol during a substantial part of the time while the reaction is proceeding.

4. The process of making mono-nitro-benzoic acid in which mono-nitro-toluol is treated with nitric acid of about 65% strength or over and further nitric acid is added after the reaction has progressed, to build up the strength of the acid, which oxydizes the mono-nitro-toluol to mono-nitro-benzoic acid.

5. The process of making mono-nitro-benzoic acid in which mono-nitro-toluol is heated with nitric acid of at least about 65% strength and further nitric acid is added during the reaction to build up the strength of the acid during the reaction by which the mono-nitro-toluol is oxydized to mono-nitro-benzoic acid.

Signed by the said ELLIS A. LLOYD at New York, in the county of New York and State of New York, this 22nd day of March, 1920.

ELLIS A. LLOYD.

Signed by the said VICTOR P. GERSHON at New York, in the county of New York, State of New York, this 22nd day of March, 1920.

VICTOR P. GERSHON.